United States Patent

Gould

[11] Patent Number: 5,154,293
[45] Date of Patent: * Oct. 13, 1992

[54] RESEALABLE PACKAGE

[76] Inventor: Charles E. Gould, 928 Central Dewey La., Nampa, Id. 83687

[*] Notice: The portion of the term of this patent subsequent to Jul. 3, 2007 has been disclaimed.

[21] Appl. No.: 690,050

[22] Filed: Apr. 23, 1991

[51] Int. Cl.$^5$ .............................................. B65D 75/58
[52] U.S. Cl. ................................... 206/461; 206/467; 206/470
[58] Field of Search ............... 206/461, 467, 469, 470

[56] References Cited

U.S. PATENT DOCUMENTS

| 2,874,836 | 2/1959  | Wertepny, Jr. .................... 206/470 |
| 3,967,730 | 7/1976  | Driscoll et al. .................... 206/461 |
| 4,106,621 | 8/1978  | Sorenson ............................ 206/365 |
| 4,200,193 | 4/1980  | Boyle ................................. 206/469 |
| 4,300,682 | 11/1981 | Kuchenbecker ................... 206/461 |
| 4,569,442 | 2/1986  | Bushey .............................. 206/469 |
| 4,586,316 | 5/1986  | Backman et al. ................... 53/449 |
| 4,781,294 | 11/1988 | Croce ................................ 206/469 |
| 4,938,462 | 7/1980  | Gould ................................ 206/467 |
| 5,067,611 | 11/1991 | Hagmann et al. .................. 206/470 |

FOREIGN PATENT DOCUMENTS

| 750764   | 11/1970 | Belgium ............................. 206/470 |
| 1570711  | 6/1969  | France .............................. 206/470 |
| 2034662  | 6/1980  | Japan ................................ 206/470 |
| 6406590  | 12/1965 | Netherlands ....................... 206/470 |
| 927035   | 5/1963  | United Kingdom ................. 206/470 |

*Primary Examiner*—Paul T. Sewell
*Assistant Examiner*—M. D. Patterson
*Attorney, Agent, or Firm*—Frank J. Dykas; Craig M. Korfanta; Ken J. Pedersen

[57] ABSTRACT

A reclosable blister package wherein the top planar surface of the blister package assembly is divided into first and second portions by a transverse concave indentation formed integrally therein. The first or lower portion of the blister package assembly is permanently attached to a planar base backing surface, with the second or upper portion being attached to the backing at its flanges by a resealable adhesive and a tab and slot, or a "button" and "hole", or a reusable attachment label. Tamper indication is provided by a tamper evident lable which is damaged upon opening, and which may have an easy-open pull string, or is provided by spot seals in the flanges in the second or upper portion.

10 Claims, 4 Drawing Sheets

RESEALABLE PACKAGE

DESCRIPTION

BACKGROUND OF THE INVENTION

1. Technical Field

This invention relates to resealable packages, and more particularly to a resealable blister type package for displaying packaged goods in a container which can be opened and resealed without obvious or apparent damage, yet has indication of tampering.

2. Background Art

A form of packaging commonly used in retail merchandising is the blister package designed for pegboard display. Generally, these types of packages have a cardboard backing, upon which product or advertising information is printed, and to which is attached a clear plastic blister assembly to form a container in which goods are displayed and held. A hole is formed at the top of the cardboard backing so that the package can be held on an extended peg of a pegboard display. In this manner large volumes of varied items can be held on a pegboard, in stores where shelf space is at a premium.

This type of packaging is used for numerous and varied types of items and would includes such things as small quantities of nails, thumb tacks, cosmetic toiletry articles, and other small items too numerous to mention. In the usual case, blister packaging is required when it is desirable to provide a convenient way of merchandising preselected number of units, such as a package containing twenty small finish nails. A second object of the conventional blister pack is to provide security for the goods, because the blister package is substantially bigger than the goods themselves, which makes pilferage and shoplifting much more difficult. An example of this would be a ballpoint pen, which if offered for sale in bulk and contained in a shelf bin, could easily be pilfered merely by picking up and inserting one in a shirt pocket. On the other hand, if held in a blister package, pilferage is a much more difficult and risky task, since the pilferer must break open the package to remove the pilferable contents.

As a result, most of the development work in the past has been directed toward providing blister package which are destroyed when opened. Typically, these blister packaging devices have a cardboard backing to which is attached a clear plastic assembly. An adhesive plastic material is first sprayed onto the surface of the cardboard, usually the entire surface in cases where the blister packaging is of the same relative size as the cardboard backing. Then the cardboard backing is positioned atop the blister pack assembly, together with its contents, and heat is applied to the flanged edges of the blister pack to bond the cardboard, plastic adhesive and blister pack assembly flanges together. This process is called heat sealing.

In order to open the package, the plastic assembly must be torn from the cardboard backing. An improvement in common use today, includes providing perforations in the cardboard backing to facilitate access to the goods through the cardboard.

A problem arises when it is desired to provide blister packaging suitable for pegboard display, wherein the blister back can easily be opened and resealed without apparent damage to the packaging itself. This would be of value in situations where it is desirable to remove the goods from the package for inspection prior to purchase, or in cases where intended use of the goods is such that the purchaser will use only a few items at a time and wish to store, in the original packaging, the remaining items. Examples of these situations would be where a prospective purchaser of an archery bow string would desire to inspect the entire string prior to purchase, or, a package of small finish nails wherein the purchaser may purchase twenty nails when only two or three are needed, with the rest to be stored for future use.

A resealable blister type packaging assembly is disclosed in Backman, et a. ("Backman"), U.S. Pat. No. 4,586,316, herein incorporated by reference. It provides a lid attached to the plastic blister assembly, which wraps around the back of a base plate. Interfitting snap lock assemblies are provided on the blister package flange, and the lid to hold the assembly together. In Croce, U.S. Pat. No. 4,781,294, also incorporated by reference, a tear package is provided with foamed polypropylene material which has resealable adhesive material on a preselected portion of the package which, after being torn open, can be reattached to the foamed polypropylene material.

While the packages disclosed in Backman and Croce are reclosable, the package of Croce cannot be used in situations where it is desirable to facilitate inspection of merchandise prior to purchase, since the package will show apparent damage once opened. In the case of Backman, the fact that the package is reclosable will be readily apparent even to the casual observer unless the lip is taped or stapled to the back of the package base.

U.S. Pat. No. 4,938,462, issued to Gould (the present inventor) and incorporated by reference, discloses a blister package with a portion which is resealable by means of a resealable adhesive. One problem with this is that a user cannot tell is the package has been opened or tampered with.

Accordingly, what is needed is a reclosable package which will not show apparent damage when opened and later reclosed, yet will appear as a conventional blister pack which cannot be opened without damage, and will provide evidence that the package has been opened. Another object of this invention is to provide a blister package which is simple and inexpensive to manufacture and assemble.

DISCLOSURE OF INVENTION

These objects are accomplished by use of a packaging system having a planar base surfaced formed of cardboard, with a heat sealing coating, and a copolyester plastic blister assembly. The plastic blister assembly has a top planar surface with an integrally formed concave indentation extending transversely across the top surface from side to side. The concave indentation defines a boundary line between the lower or first planar surface and an upper, reclosable, second planar surface.

A pair of first opposing side walls and an interconnecting end wall extend from the edges of the lower, first planar surface to form, when the plastic assembly is attached to the base plate, a container for the packaged merchandise. An attachment flange circumvolves the end and side walls of the lower, first portion, and provides an attachment surface for adhesively attaching the plastic container to the backing plate. The plastic blister assembly is permanently attached to the cardboard planar base plate by means of a heat sealing process using a nonsealable adhesive between the first attachment flange and the base plate.

The upper, or second, planar surface, in like manner, has extending from tis sides and end, second or upper end and side walls, and a circumvolving, second attachment flange, all similar in size and appearance to the first or lower end, end wall, side walls and attachment flange.

Removable attachment means is provided in the upper section in the form of a tab and slot, a "button" and "hole", or a reusable attachment label.

Tamper evident sealing means is provided in the form of a tamper evident label which contacts the attachment flange and backing an which is damaged upon opening. The tamper evident label may have an easy-open pull string to facilitate opening. Alternatively, the attachment flange may be spot-sealed so that the backing is permanently disturbed when the package is opened, yet the overall package is not damaged.

BRIEF DESCRIPTION OF THE DRAWINGS

FIGS. 6 and 7 are representative planar views of the blister package, showing a tamper evident label.

FIG. 8 illustrates a tamper evident label having an easy-open pull string.

FIG. 9a is a perspective representational view of the embodiment in an open position.

FIG. 10 illustrates a tamper evident adhesive seal embodiment.

BEST MODE FOR CARRYING OUT THE INVENTION

Figure 1:
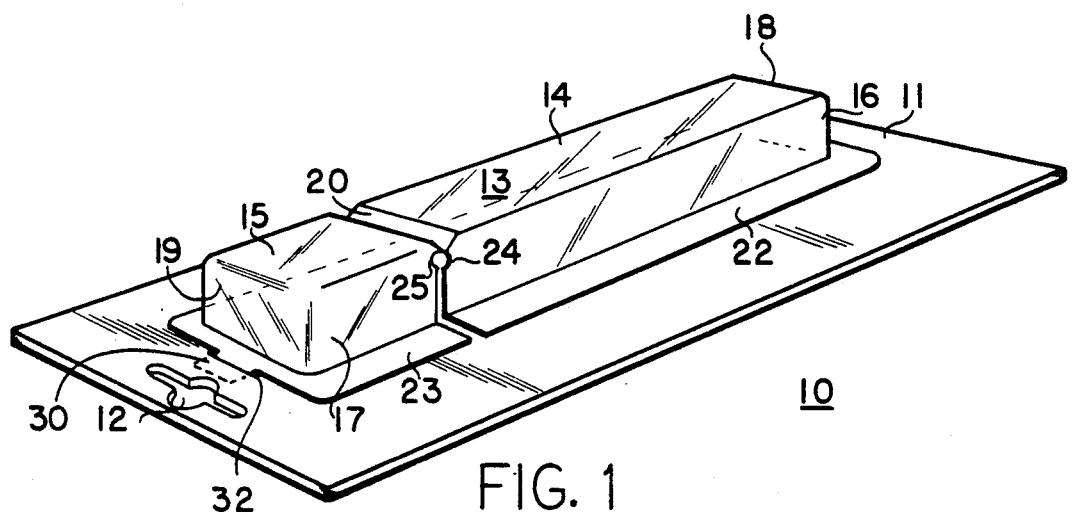
FIG. 1 is a perspective representational view of a tab and slot embodiment of the reclosable blister package assembly in a closed position.
Figure 2:
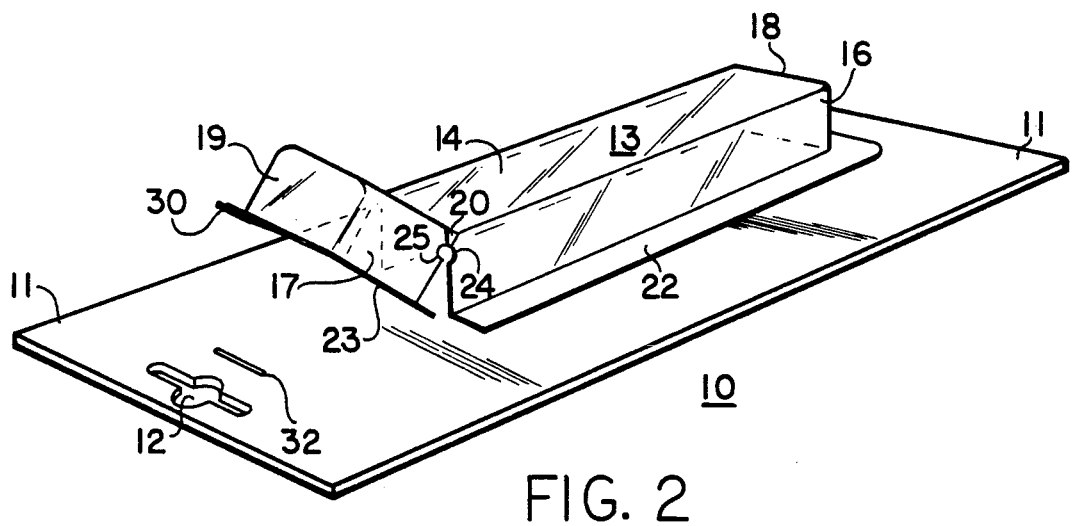
FIG. 2 is a perspective representational view of a tab and slot embodiment of the reclosable blister package assembly in an opened position.

As shown in FIGS. 1 and 2, my plastic blister package assembly 10 is designed to be hung from a peg hook inserted through peg hook hole 12 in cardboard planar base plate 11. A plastic blister assembly 13, formed of unitary construction and preferably of copolyester plastic, typically a glycol modified polyethylene terephthalate, is provided for attachment to planar base plate 11.

Transverse concave indentation 20 is integrally formed in the top surface of plastic assembly 13 and serves as a dividing line between a first or lower portion of planar top surface 14 and upper, second portion of planar top surface 15.

Extending from the sides of lower, first portion planar surface 14 are first portion side walls 16 and an interconnecting first portion end wall 18. Circumvolving side walls 16 and end wall 18 is first portion attachment flange 22. Attachment flange 22 is heat sealed to the base plate 11 for permanently attaching plastic assembly 13 to base plate 11. When so attached a compartment is formed into which merchandise can be inserted.

In like manner, the second, or upper portion planar top surface 15 has extending from its sides, second portion side walls 17 and interconnecting second portion end wall 19. Circumvolving side walls 17 and interconnecting end wall 19 is second portion attachment flange 23.

When the upper portion of plastic assembly 13 is in the closed position, with second attachment flange 23 positioned against base plate 11, the blister package assembly 10 appears to be of unitary construction having a single compartment all of which is adhesively attached by means of a circumvolving attachment flange to base plate 11.

By providing separate pairs of opposing side walls 16 and 17, and transverse concave indentation 20 with optional semicircular notches 24 in the edges of walls 16 juxtaposed with optional semicircular notches 25 in the edges of walls 17 immediately adjacent to the ends of concave indentation 20, the upper portion of plastic assembly 13 can be folded out away from base plate 11 to provide access to the merchandise compartment defined by the lower portion of plastic assembly 13 and base plate 11, even though base plate 11 is without any hinges as is shown in FIG. 2.

As shown in FIGS. 1 and 2, mating portions such as tab portion 30 in flange 23 and slot 32 in backing 11, for example, are provided to make the package openable and reclosable without apparent damage. Tab 30 slips into slop 32 when the package is closed.

Figure 3:
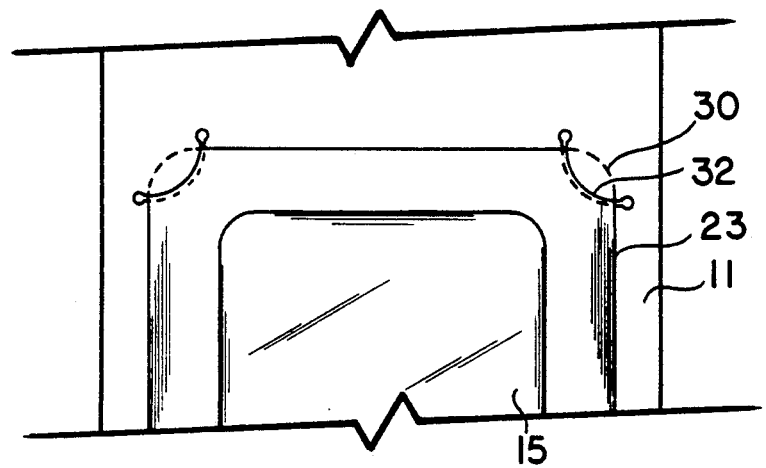
FIGS. 3-5 are representative top planar views of different variations of the reclosable tab and slot blister packages.

In FIG. 3, a corner of second portion attachment flange 23 serves as tab portion 30 and corresponding slot 32 is provided in backing 11. The package is shown in a closed position.

Figure 4:
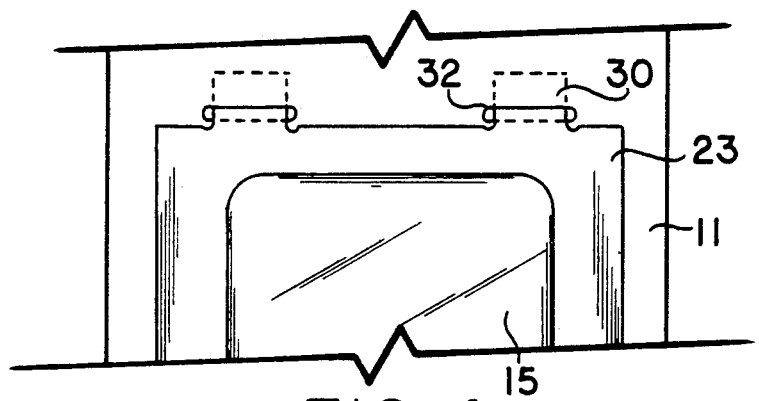

FIG. 4 shows tab 30 explicitly provided in flange 23, and again, corresponding slot 32 is provided in backing 11.

Figure 5:
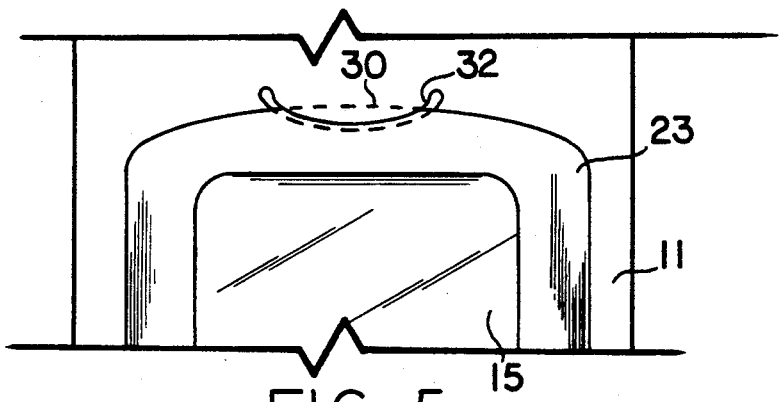

If flange 23 has a rounded or otherwise extended shaped, as shown in FIG. 5, a portion of flange 23 serves as tab portion 30 and is inserted into slot 32, which is curved oppositely. Opposite curvature is preferred, although other shaped slots may suffice.

Figure 6:
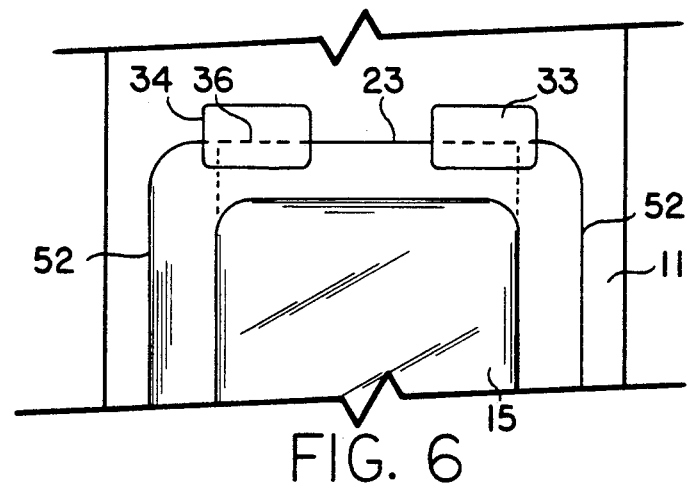
FIG. 6 is a representative planar view of an attachment label embodiment of the reclosable blister package assembly.

Instead of mating portions, attachment label 33 may be provided, as shown in FIG. 6. Attachment label 33 is held on with reusable, resealable adhesive. It is noted here that if portions 52 were removed, so making flange 23 not strictly circumvolving, that the requirements for the invention is still met. "Circumvolving" then, in this application, describes not only true circumvolution but also partial circumvolution when a portion such as 52 is not provided.

Because the inventive package may be opened and reclosed with no apparent damage, some indication of tampering may be provided in the form of tamper evident label 34. Tamper evident label 34 is attached with nonreusable adhesive across a portion of flange 23 and backing 11, so that it must tear (along line 36, for example) or otherwise be destroyed when the package is originally opened. Torn label 34 is therefore evidence of tampering.

Figure 7:
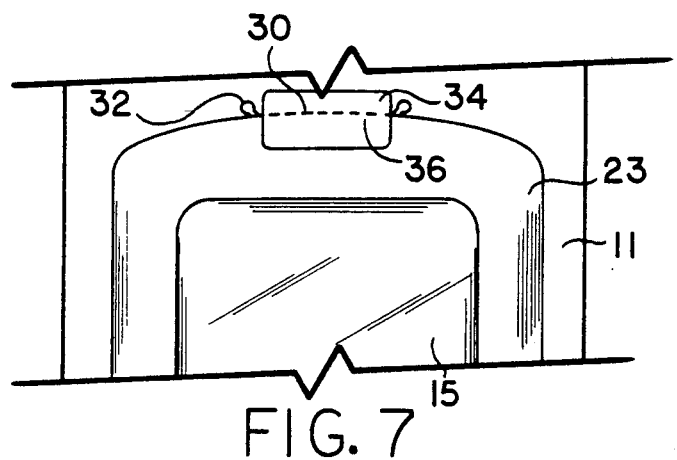

Tamper evident label 34 may also be used with tabs and slots, as shown in FIG. 7. The package is originally sealed with tamper evident label 34 across a portion of flange 23 and backing 11, in this example across tab 30 lying over slot 32. When the package is originally opened, label 34 tears along line 36, indicating tampering. The package, still undamaged, is reclosable by inserting tab 30 into slot 32, as was illustrated in FIG. 5.

Figure 8A:
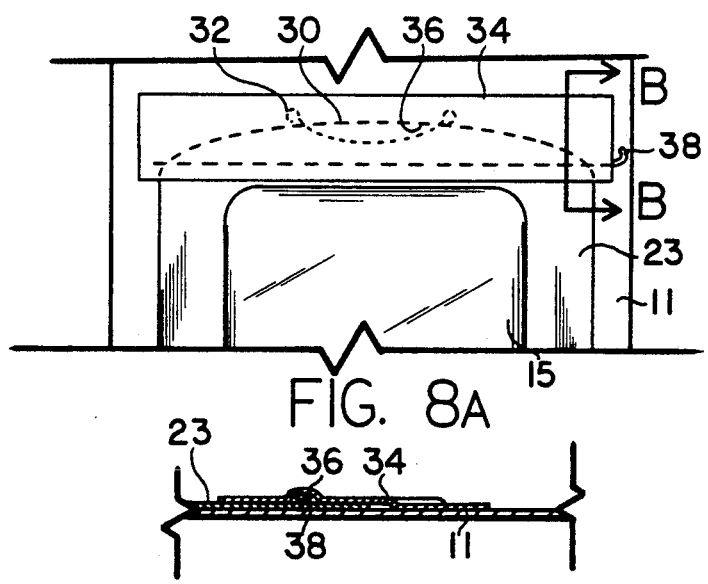
FIG. 8a is a planar view and FIG. 8b is a representative cross-sectional view along AA.
Figure 8B:
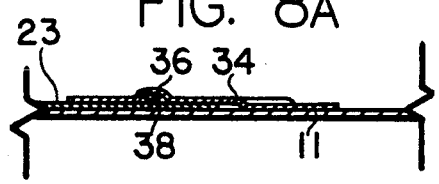

FIG. 8 shows an easy-open string pull 38 incorporated with tamper evident label 34. The package is originally sealed by label 34, with string pull 38 preferably running along an edge of flange 23, so that when string 38 is pulled, a tear is automatically and cleanly provided along line 36, which coincides with flange 23 edge.

Figure 9A:
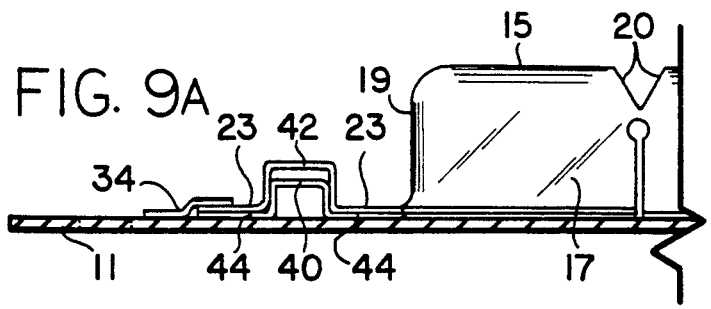
FIG. 9a is a representative cross-sectional view of the embodiment in a closed position.
Figure 9B:
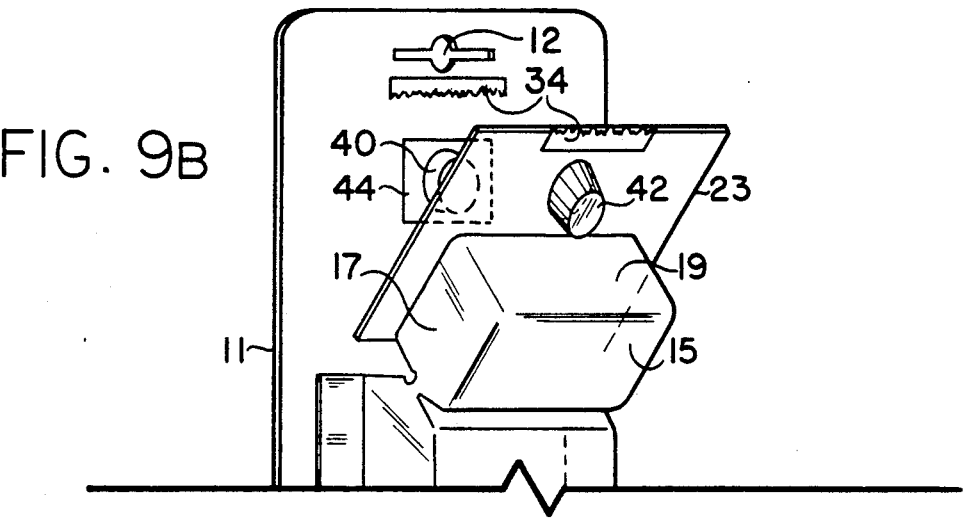
FIG. 9 shows a button and hole embodiment.

As shown in FIG. 9, mating portions are provided in the form of a "button" 40 and "hole" 42. Button 40 is formed with a button flange 44, which is permanently attached to backing 11. Hole 42 is formed within second attachment flange 23, so that when the package is closed, as illustrated in FIG. 9a, hole 42 mates with button 40, holding together and keeping the package closed. Tamper evident label 34 may also be provided, which tears upon opening, as illustrated in FIG. 9b.

Figure 10A:
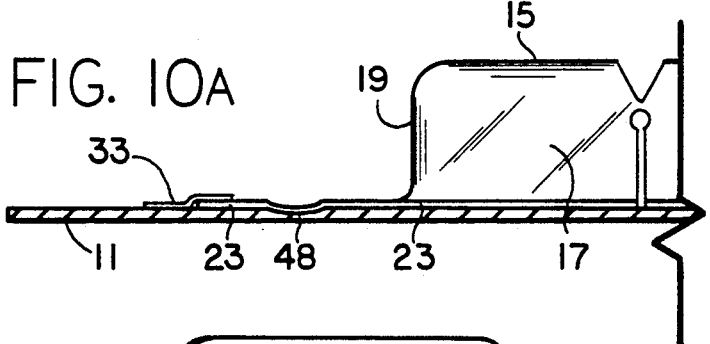
FIG. 10a is a representative cross-sectional view of the embodiment in a closed position.
Figure 10B:
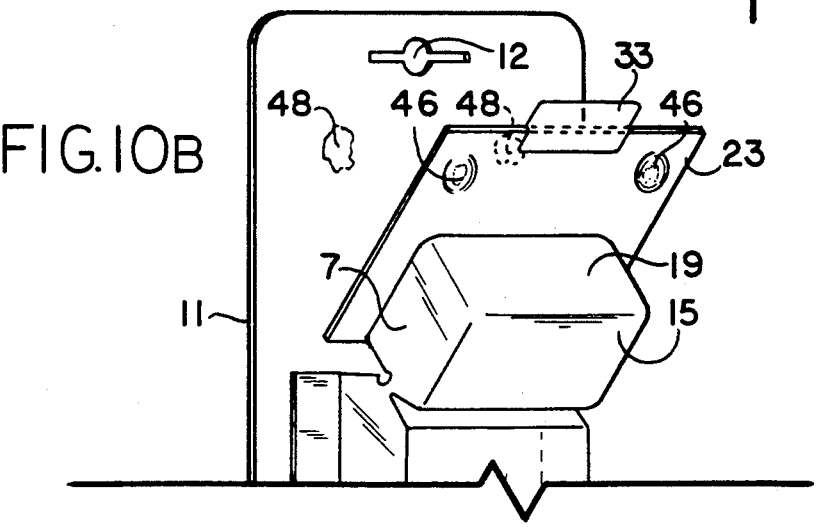
FIG. 10b is a perspective representational view of the embodiment in an open position after the seal is broken.

FIG. 10 shows a tamper evident adhesive seal embodiment. Spot seal portion 46 is provided in flange 23. When the package is originally sealed, flange 23 is adhered to backing 11 at spot seal portion 46, to position 48 in backing 11. When the package is first opened, as shown in FIG. 10b, backing 11 is disturbed at positions 48 by the spot seal portion 46 tearing away. In this manner evidence of tampering is provided yet the package is not damaged. Attachment label 33, for example, is provided for reclosability.

While there is shown and described the present preferred embodiment of the invention, it is to be distinctly understood that this invention is not limited thereto but may be variously embodied to practice within the scope of the following claims.

I claim:

1. A reclosable package comprising:
   a planar base surface without any hinges;
   a top planar surface having opposing sides and opposing ends, said top planar surface further having a concave indentation formed therein and extending transversely across said top planar surface from side to side so as to form a first portion of said top planar surface on one side of the concave indentation and a second portion of said top planar surface on the other side;
   a pair of first portion opposing side walls and an interconnecting end wall, for holding the top planar surface in spaced relationship to the planar base surface, and for attachment to the planar base surface, extending out from the sides and end of the first portion of the top planar surface;
   means for permanently attaching said first portion side walls and end wall to the planar base surface;
   a pair of second portion opposing side walls and an interconnecting end wall, for holding the top planar surface in spaced relationship to the planar base surface and for attachment to the planar base surface, extending out from the sides and end of the second portion of said top planar surface;
   means for removably attaching said second portion opposing side walls and end wall to the planar base surface which comprises:
   an attachment flange circumvolving said second portion opposing side walls and end wall, having a tab portion; and
   a slot in said planar base surface, able to receive said tab portion; and
   tamper evident sealing means, sealing said planar base surface to said means for removably attaching said second portion opposing side walls and end walls thereto, which is permanently altered when the package is first opened.

2. The reclosable blister package of claim 1 wherein the means for attaching the first portion side walls and end wall to the planar base surface further comprises a first attachment flange circumvolving the first portion side walls and interconnecting end wall, attached to the planar base surface.

3. The reclosable blister package of claim 1 wherein the means for removably attaching said second portion opposing side walls and end wall to the planar base surface comprises:
   a second attachment flange circumvolving said second portion opposing side walls and end wall, having a hole; and
   a button, attached to said planar base surface, able to mate with said hole when the package is closed, thereby keeping the package reopenably closed.

4. The reclosable blister package of claim 1 wherein the means for removably attaching said second portion opposing side walls and end wall to the planar base surface comprises:
   a second attachment flange circumvolving said second portion opposing side walls and end wall, having a hold; and
   a reusable attachment label, removably attaching said second attachment flange to said planar base surface.

5. The reclosable blister package of claim 1 wherein the means for removably attaching said second portion opposing side walls and end wall to the planar base surface comprises a resuable attachment label, removably attaching one of said second portion opposing side walls and end wall to said planar base surface.

6. The reclosable blister package of claim 1 wherein the tamper evident sealing means comprises:
   a second attachment flange circumvolving said second portion opposing side walls and end wall, having a hole; and
   a tamper evident sealing label, attaching said second attachment flange to said planar base surface, so that said tamper evident sealing label tears when the package is first opened.

7. The reclosable blister package of claim 1 wherein the tamper evident sealing means comprises:
   a second attachment flange circumvolving said second portion opposing side walls and end wall, having a hole; and
   a tamper evident sealing label, attaching said second attachment flange to said planar base surface, having an easy-open pull string, so tat to first open the package, the easy-open pull string is pulled, forming a tear in said tamper evident sealing label.

8. The reclosable blister package of claim 1 wherein the tamper evident sealing means comprises a second attachment flange circumvolving said second portion opposing side walls and end wall, spot sealed to said planar base surface.

9. The reclosable blister package of claim 1 wherein said first and second portion opposing side walls each have notches formed therein in juxtaposed relationship to each other and adjacent to the side edges of the concave indentation formed in the top planar surface.

10. The reclosable blister package of claim 1 wherein said top planar surface, said first and second portion end and side walls, and first and second attachment flanges are formed of a glycol modified polyethylene terephthalate material.

* * * * *